(12) United States Patent

Bernhardt et al.

(10) Patent No.: US 12,607,478 B2

(45) Date of Patent: Apr. 21, 2026

(54) SYSTEM AND A METHOD FOR VALIDATION OF SENSOR DATA

(71) Applicant: HERE Global B.V., Eindhoven (NL)

(72) Inventors: Bruce Bernhardt, Wauconda, IL (US); Yuxin Guan, Chicago, IL (US); Jingwei Xu, Buffalo Grove, IL (US); Leon Stenneth, Chicago, IL (US); Amarnath Nayak, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 169 days.

(21) Appl. No.: 18/077,066

(22) Filed: Dec. 7, 2022

(65) Prior Publication Data

US 2024/0192017 A1 Jun. 13, 2024

(51) Int. Cl.
*G01C 21/00* (2006.01)

(52) U.S. Cl.
CPC .............................. *G01C 21/3815* (2020.08)

(58) Field of Classification Search
CPC ................................................ G01C 21/3815
USPC ........................................................ 701/450
See application file for complete search history.

(56) References Cited

U.S. PATENT DOCUMENTS

| | | | | |
|---|---|---|---|---|
| 2003/0090392 A1* | 5/2003 | Schuessler | ............. | G08G 1/162 |
| | | | | 340/988 |
| 2017/0352262 A1* | 12/2017 | Xu | ........................ | G08G 1/0133 |
| 2019/0250622 A1 | 8/2019 | Nister et al. | | |

| | | | | |
|---|---|---|---|---|
| 2020/0117565 A1* | 4/2020 | Ponnuvel | ................ | G06F 11/27 |
| 2020/0210898 A1* | 7/2020 | Tamagawa | ............. | G06Q 50/04 |
| 2020/0240801 A1* | 7/2020 | Zhang | ................ | G01C 21/3841 |
| 2021/0203157 A1* | 7/2021 | Visweswariah | ....... | G06F 18/214 |
| 2021/0389817 A1* | 12/2021 | Spinelli | .................... | G06N 5/01 |
| 2022/0229868 A1* | 7/2022 | Belani | .................... | G06N 20/00 |

FOREIGN PATENT DOCUMENTS

| | | |
|---|---|---|
| CN | 111798662 A | 10/2020 |
| CN | 111882122 A | 11/2020 |
| EP | 3251107 A1 | 12/2017 |
| WO | 2016123424 A1 | 8/2016 |

OTHER PUBLICATIONS

Steenbruggen, abstract of "Data from Telecommunication Networks for Incident Management: An Exploratory Review on Transport Safety and Security", Transport Policy, vol. 28, Jul. 2013, 4 pages.

* cited by examiner

*Primary Examiner* — Andrea C Leggett

(74) *Attorney, Agent, or Firm* — DITTHAVONG, STEINER, & MLOTKOWSKI

(57) ABSTRACT

The disclosure provides a system, a method, and a computer program product for validation of sensor data. The system may be configured to receive sensor data associated with a hazard. The sensor data may include at least a first time of occurrence of the hazard. The system may be further configured to determine a second time of occurrence of the hazard based on a time-space diagram associated with one or more vehicles that passed through a location of the occurrence of the hazard. The system may further calculate a validation result for the received sensor data based on a comparison of the first time of occurrence and the second time of occurrence, and an associated first predefined threshold.

19 Claims, 9 Drawing Sheets

Figure 2C:
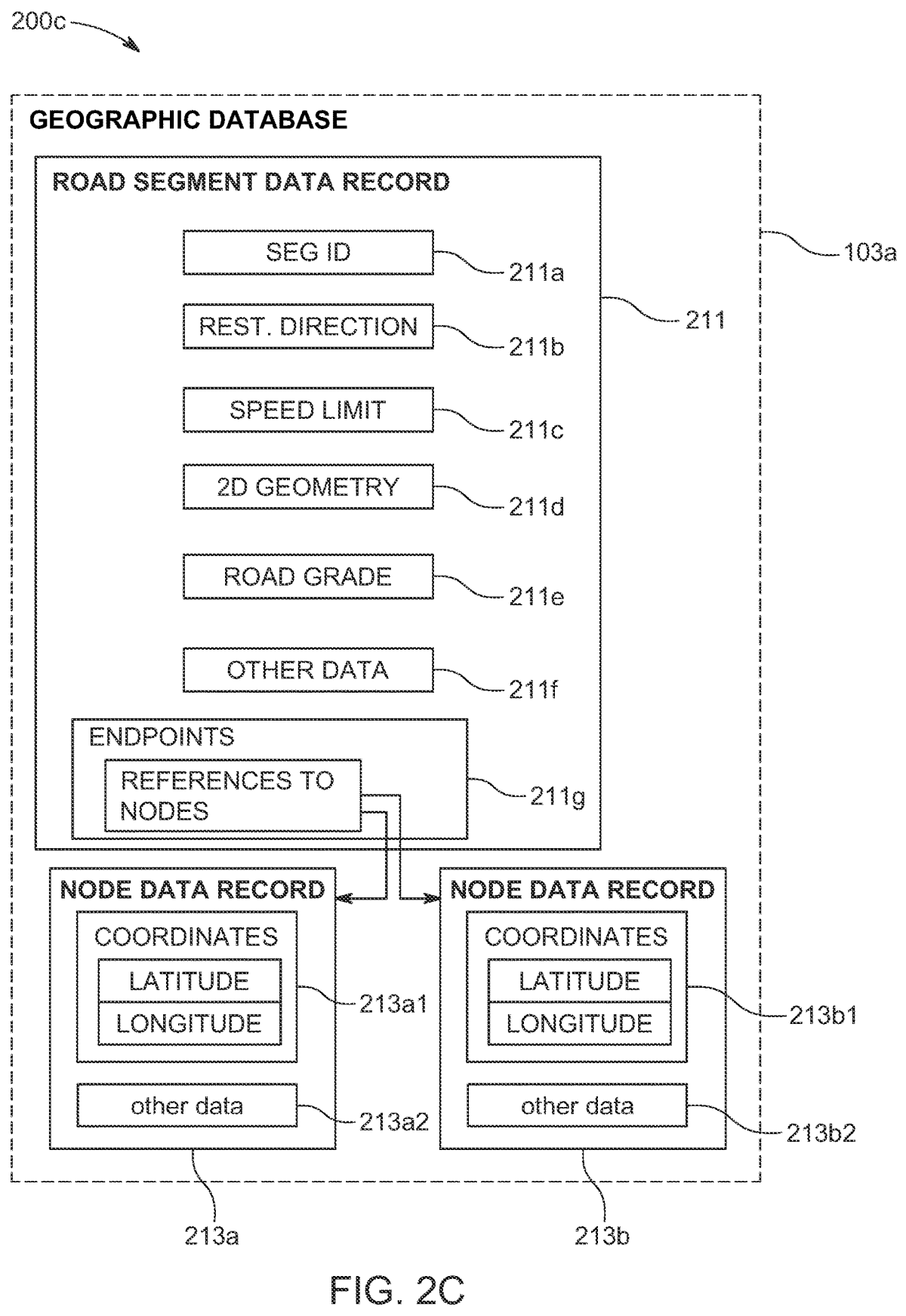

200c

GEOGRAPHIC DATABASE

ROAD SEGMENT DATA RECORD

SEG ID — 211a

REST. DIRECTION — 211b

SPEED LIMIT — 211c

2D GEOMETRY — 211d

ROAD GRADE — 211e

OTHER DATA — 211f

ENDPOINTS
REFERENCES TO NODES — 211g

211

103a

NODE DATA RECORD

COORDINATES
LATITUDE
LONGITUDE — 213a1 other data — 213a2

213a

NODE DATA RECORD

COORDINATES
LATITUDE
LONGITUDE — 213b1 other data — 213b2

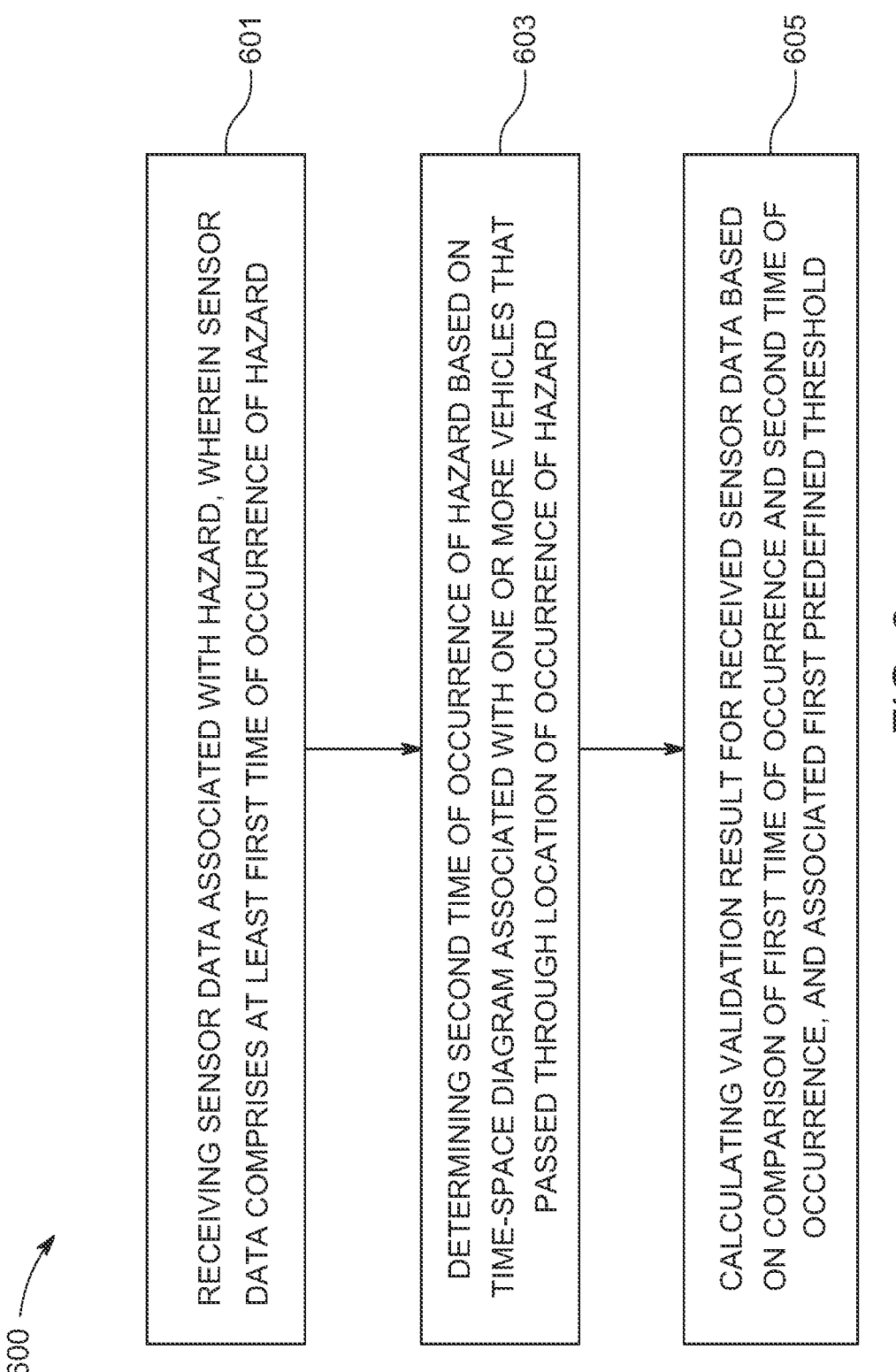

RECEIVING SENSOR DATA ASSOCIATED WITH HAZARD, WHEREIN SENSOR DATA COMPRISES AT LEAST FIRST TIME OF OCCURRENCE OF HAZARD — 601

DETERMINING SECOND TIME OF OCCURRENCE OF HAZARD BASED ON TIME-SPACE DIAGRAM ASSOCIATED WITH ONE OR MORE VEHICLES THAT PASSED THROUGH LOCATION OF OCCURRENCE OF HAZARD — 603

CALCULATING VALIDATION RESULT FOR RECEIVED SENSOR DATA BASED ON COMPARISON OF FIRST TIME OF OCCURRENCE AND SECOND TIME OF OCCURRENCE, AND ASSOCIATED FIRST PREDEFINED THRESHOLD — 605

SYSTEM AND A METHOD FOR VALIDATION OF SENSOR DATA

TECHNOLOGICAL FIELD

The present disclosure generally relates to hazard warnings in vehicles, and particularly relates to systems and methods for validation of sensor data related to hazard warnings.

BACKGROUND

Typically, hazard warning systems are implemented in vehicles, such as autonomous vehicles, semi-autonomous vehicles, and non-autonomous vehicles. Such hazard warning systems utilize one or more sensors to detect hazards and provide warnings related to the detected hazards to a driver of the vehicle. In certain scenarios, the one or more sensors falsely detect the hazards and provide the warnings. Conventionally, dedicated ground drivers are deployed to detect and verify the hazard. However, deployment of the dedicated ground drivers is expensive and risky.

Therefore, there is a need for improved system and method for validation of hazard data.

BRIEF SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

The present disclosure provides a system, a method and a computer programmable product for validation of sensor data. The system may enable validation of the sensor data associated with sensors of hazard warning systems implemented in vehicles. Generally, conventional systems may deploy dedicated ground drivers to detect and verify hazard, that may be expensive as well as risky. On the contrary, the system of the present disclosure may validate a time of occurrence of the hazard received as a part of the sensor data, based on a time-space diagram. Thus, the system may eliminate a need of deployment of the dedicated ground drivers, thereby providing an inexpensive and risk-free validation of the sensor data.

Some example embodiments disclosed herein provide a system for validation of sensor data, the system comprising a memory configured to store computer-executable instructions and one or more processors configured to execute the instructions to receive sensor data associated with a hazard. The sensor data comprises at least a first time of occurrence of the hazard. The one or more processors are further configured to determine a second time of occurrence of the hazard based on a time-space diagram associated with one or more vehicles that passed through a location of the occurrence of the hazard. The one or more processors are further configured to calculate a validation result for the received sensor data based on a comparison of the first time of occurrence and the second time of occurrence, and an associated first predefined threshold.

According to some example embodiments, the at least one processor is further configured to perform map matching to determine one or more identifiers associated with a link corresponding to the location of occurrence of the hazard. Based on the one or more identifiers associated with the link, the at least one processor is configured to determine a point of origin for the time-space diagram. The at least one processor is further configured to generate the time-space diagram by utilization of the determined point of origin.

According to some example embodiments, the at least one processor is further configured to receive the generated time-space diagram as an input. Based on the received generated time-space diagram, the at least one processor is configured to determine a change in speed of the vehicle. The at least one processor is further configured to determine the second time of occurrence of the hazard as an output, based on the determined change in speed of the vehicle.

According to some example embodiments, to calculate the validation result based on the comparison, the at least one processor is further configured to compare the first time of occurrence and the second time of occurrence to compute a difference between the first time of occurrence of the hazard and the second time of occurrence of the hazard. The at least one processor is further configured to compare the computed difference with the first predefined threshold.

According to some example embodiments, the at least one processor is further configured to calculate the validation result as a true positive data, based on a determination that the computed difference is less than or equal to the first predefined threshold.

According to some example embodiments, the at least one processor is further configured to calculate the validation result as a false positive data, based on a determination that the computed difference is more than the first predefined threshold.

According to some example embodiments, the at least one processor is further configured to generate a confusion matrix associated with a sensor that records the sensor data. The confusion matrix comprises at least one validation result as a true positive data, and at least one validation result as a false positive data.

According to some example embodiments, the at least one processor is further configured to determine an accuracy level of the sensor based on the generated confusion matrix, wherein the sensor is determined to be accurate when the determined accuracy level is more than or equal to a second predefined threshold.

According to some example embodiments, the at least one processor is further configured to update a map database based on the calculated validation result.

According to some example embodiments, the at least one processor is further configured to utilize an artificial intelligence module for processing the time-space diagram of the vehicle associated with the hazard, wherein the artificial intelligence module is trained on a task of determination of the second time of occurrence of the hazard based on the generated time-space diagram as an input.

According to some example embodiments, the artificial intelligence module is a computer vision-based model.

Some example embodiments disclosed herein provide a method for validation of sensor data. The method may include reception of sensor data associated with a hazard. The sensor data comprises at least a first time of occurrence of the hazard. The method may further include determination of a second time of occurrence of the hazard based on a time-space diagram associated with one or more vehicles that passed through a location of the occurrence of the hazard. The method may further include calculation of a validation result for the received sensor data based on a comparison of the first time of occurrence and the second time of occurrence, and an associated first predefined threshold.

According to some example embodiments, the method further comprises performing map matching to determine one or more identifiers associated with a link corresponding to the location of occurrence of the hazard. Based on the one or more identifiers associated with the link, the method further comprises determination of a point of origin for the time-space diagram. The method further comprises generation of the time-space diagram by utilization of the determined point of origin.

According to some example embodiments, the method further comprises reception of the generated time-space diagram as an input. Based on the generated time-space diagram, the method further comprises determination of a change in speed of the vehicle. The method further comprises determination of the second time of occurrence of the hazard as an output, based on the determined change in speed of the vehicle.

According to some example embodiments, to calculate the validation result based on the comparison, the method further comprises comparison of the first time of occurrence and the second time of occurrence to compute a difference between the first time of occurrence of the hazard and the second time of occurrence of the hazard. The method further comprises comparison of the computed difference with the first predefined threshold.

According to some example embodiments, the method further comprises calculation of the validation result as a true positive data, based on a determination that the computed difference is less than or equal to the first predefined threshold.

According to some example embodiments, the method further comprises calculation of the validation result as a false positive data, based on a determination that the computed difference is more than the first predefined threshold.

According to some example embodiments, the method further comprises generation of a confusion matrix associated with a sensor that records the sensor data. The confusion matrix comprises at least one validation result as a true positive data, and at least one validation result as a false positive data.

According to some example embodiments, the method further comprises determination of an accuracy level of the sensor based on the generated confusion matrix, wherein the sensor is determined to be accurate when the determined accuracy level is more than or equal to a second predefined threshold.

Some example embodiments disclosed herein provide a computer programmable product comprising a non-transitory computer readable medium having stored thereon computer executable instruction which when executed by one or more processors, cause the one or more processors to carry out operations for validation of sensor data, the operations comprising reception of sensor data associated with a hazard. The sensor data comprises at least a first time of occurrence of the hazard. The operations further comprise determination of a second time of occurrence of the hazard based on a time-space diagram associated with one or more vehicles that passed through a location of the occurrence of the hazard. The operations further comprise calculation of a validation result for the received sensor data based on a comparison of the first time of occurrence and the second time of occurrence, and an associated first predefined threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
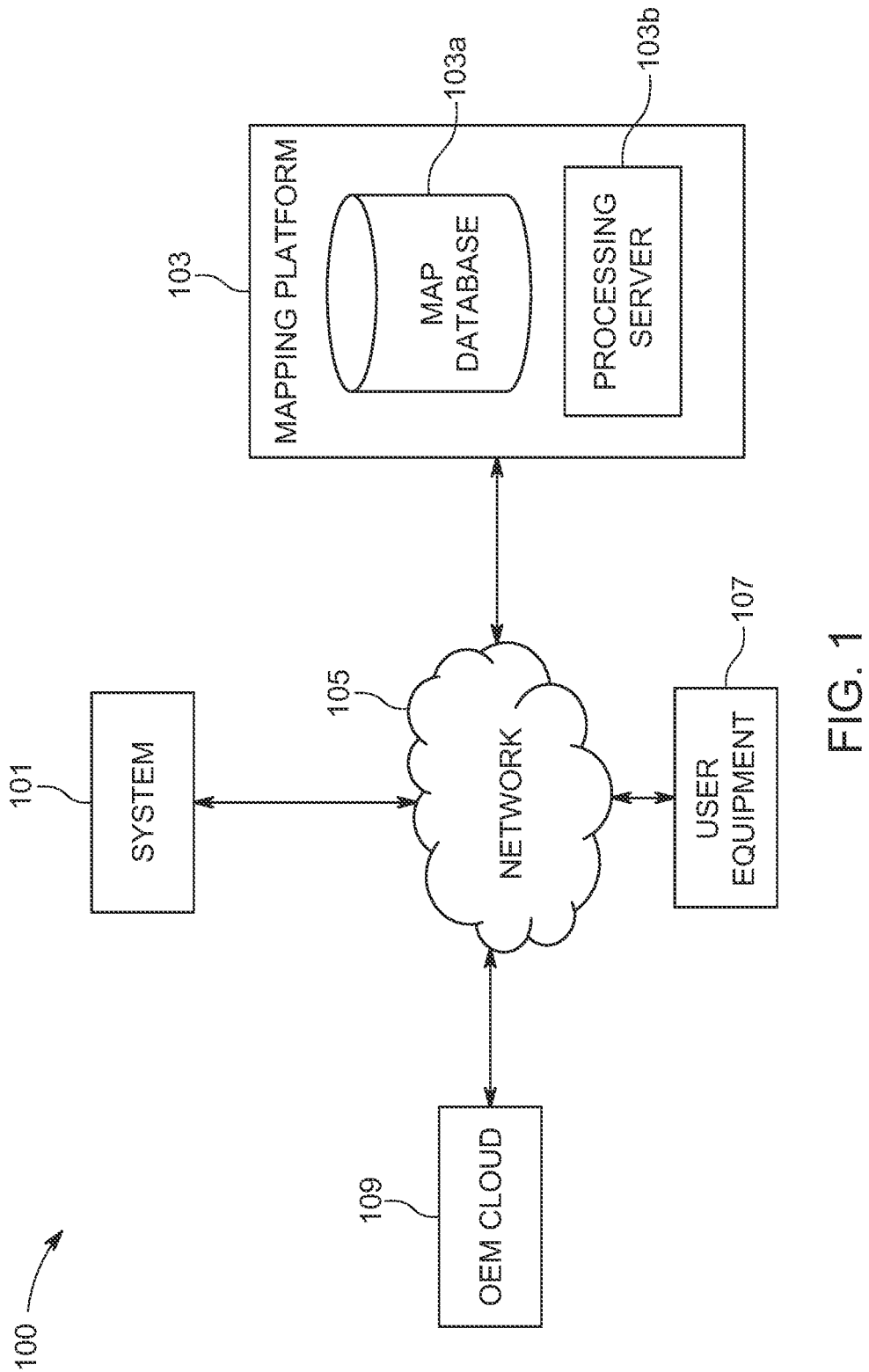
Figure 2A:
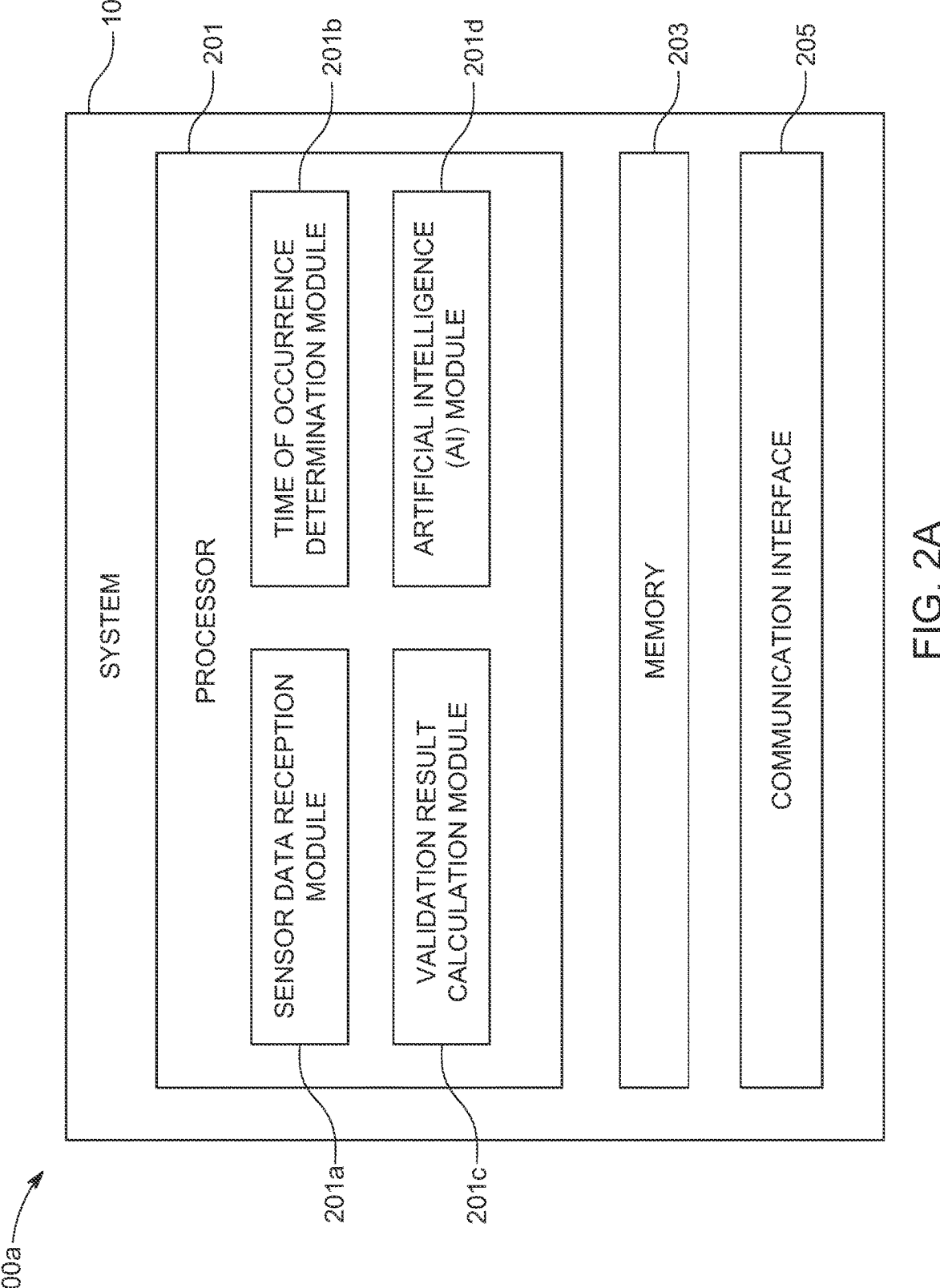
Figure 2B:
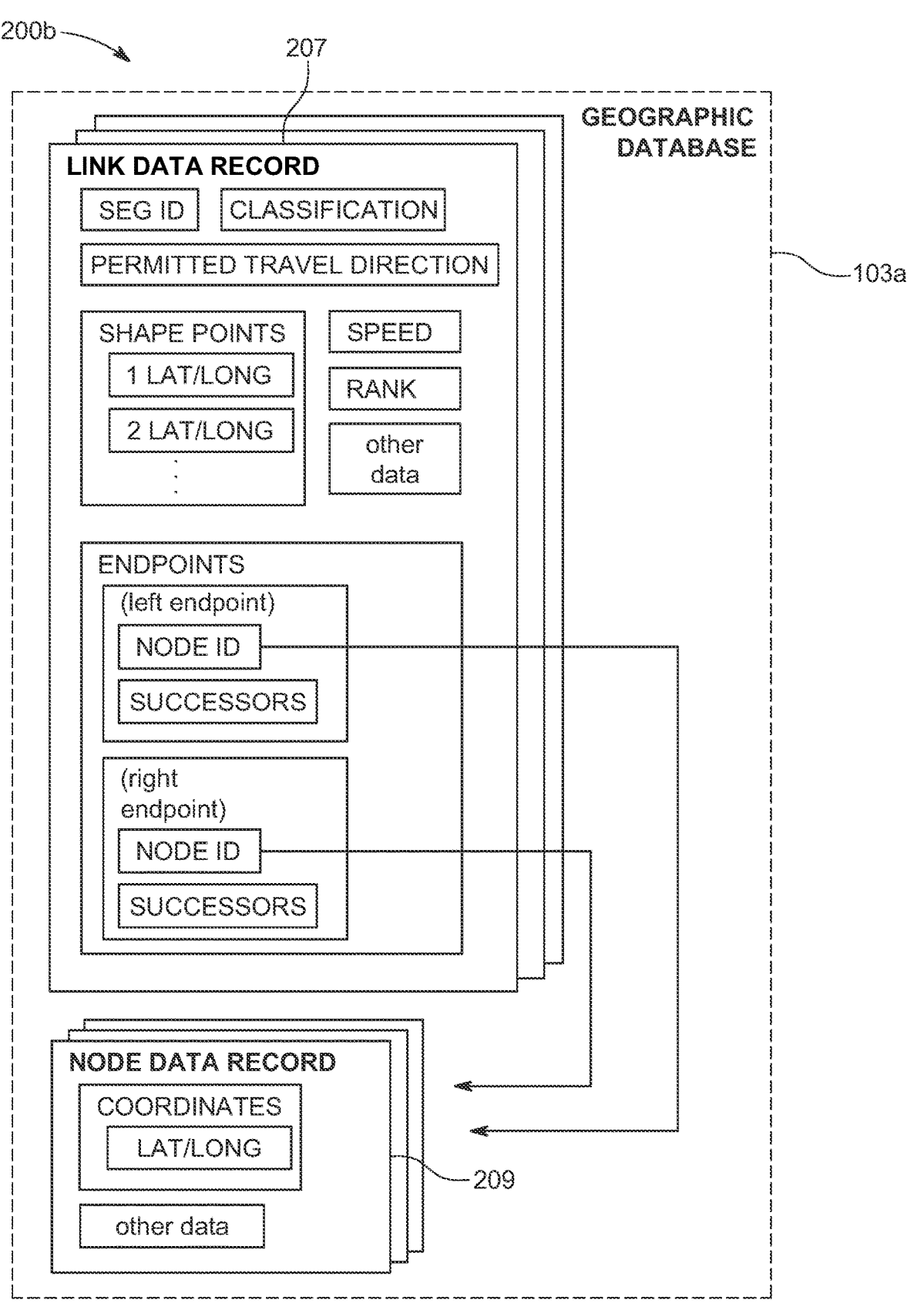
Figure 2D:
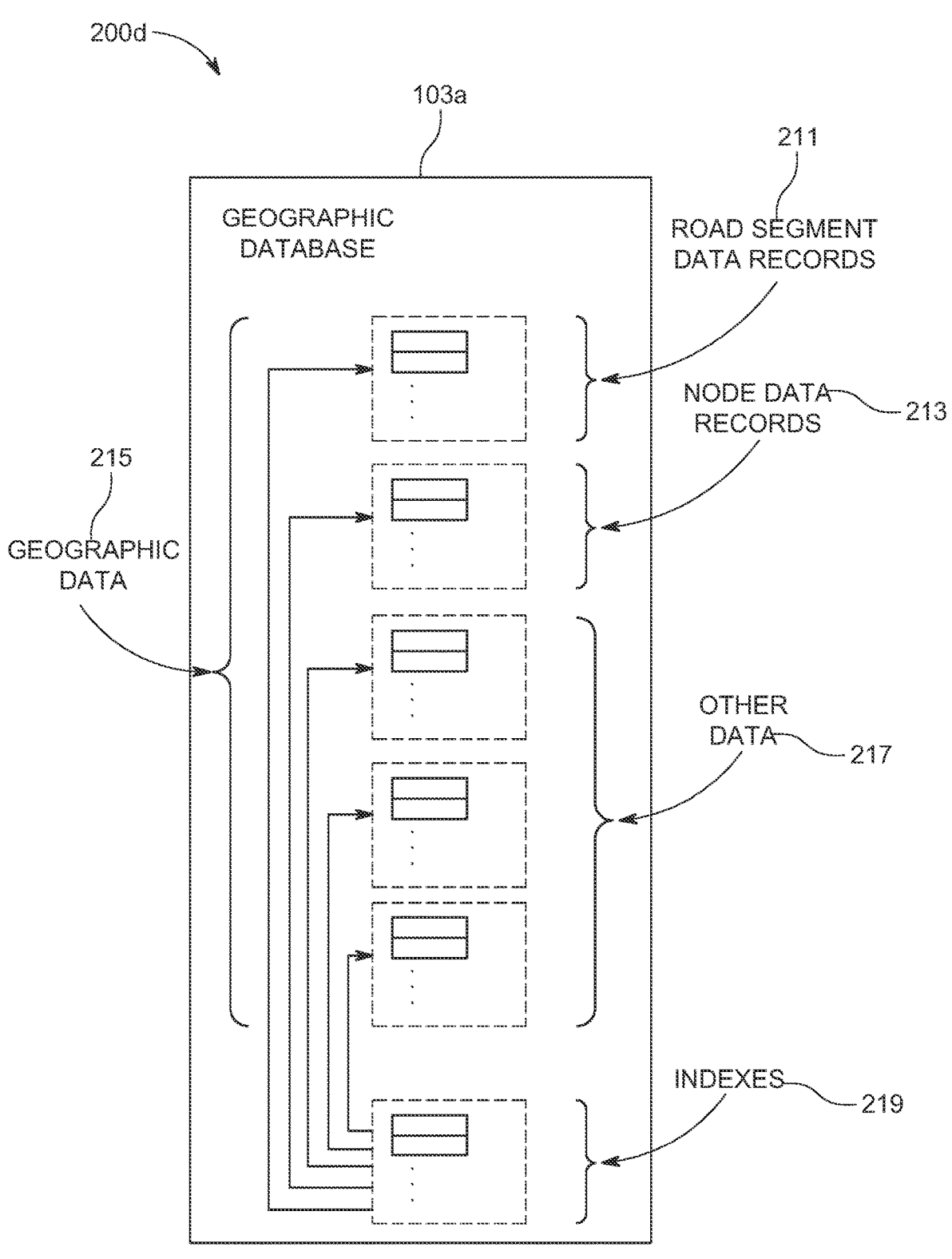
Figure 3:
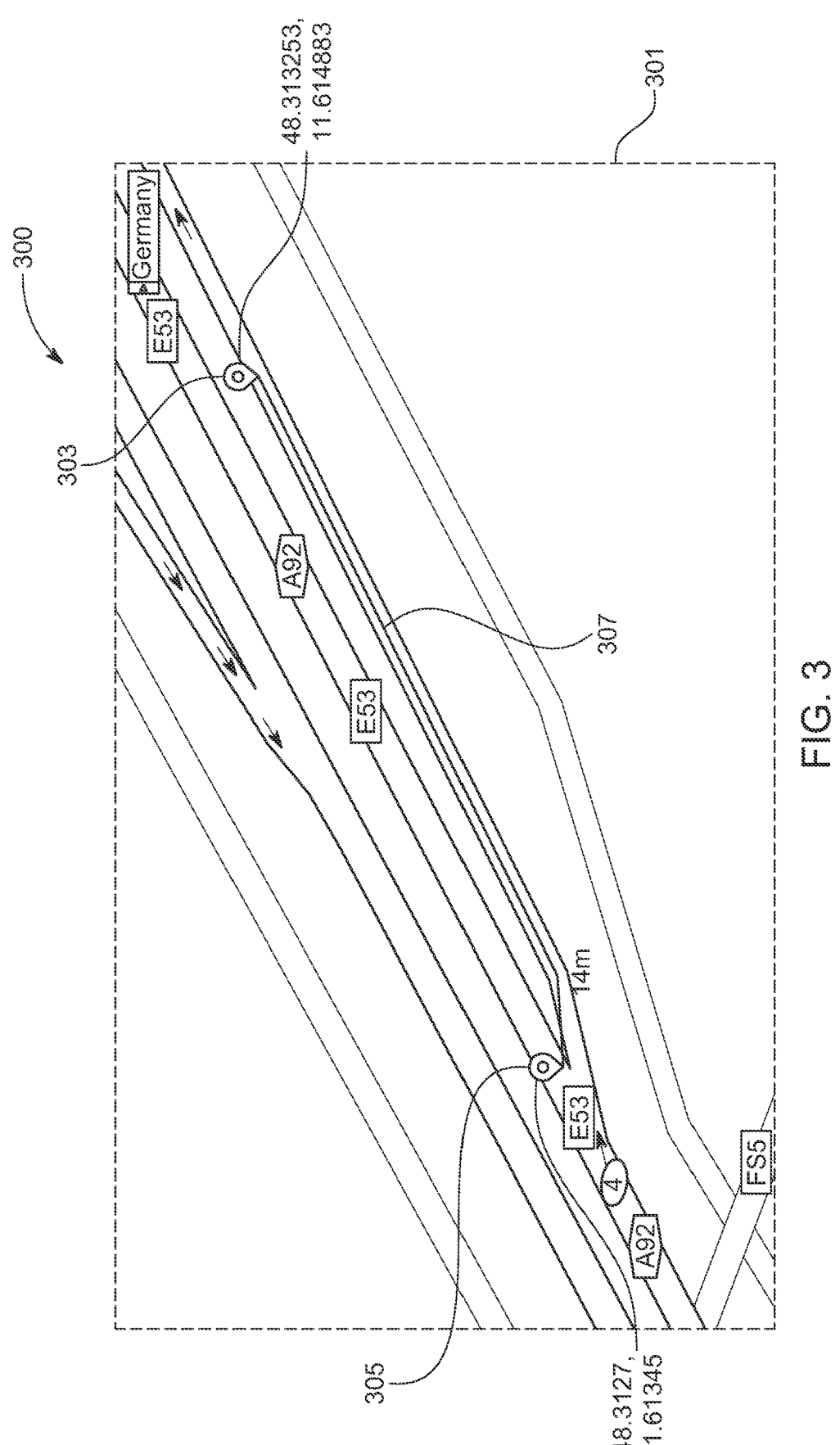
Figure 4:
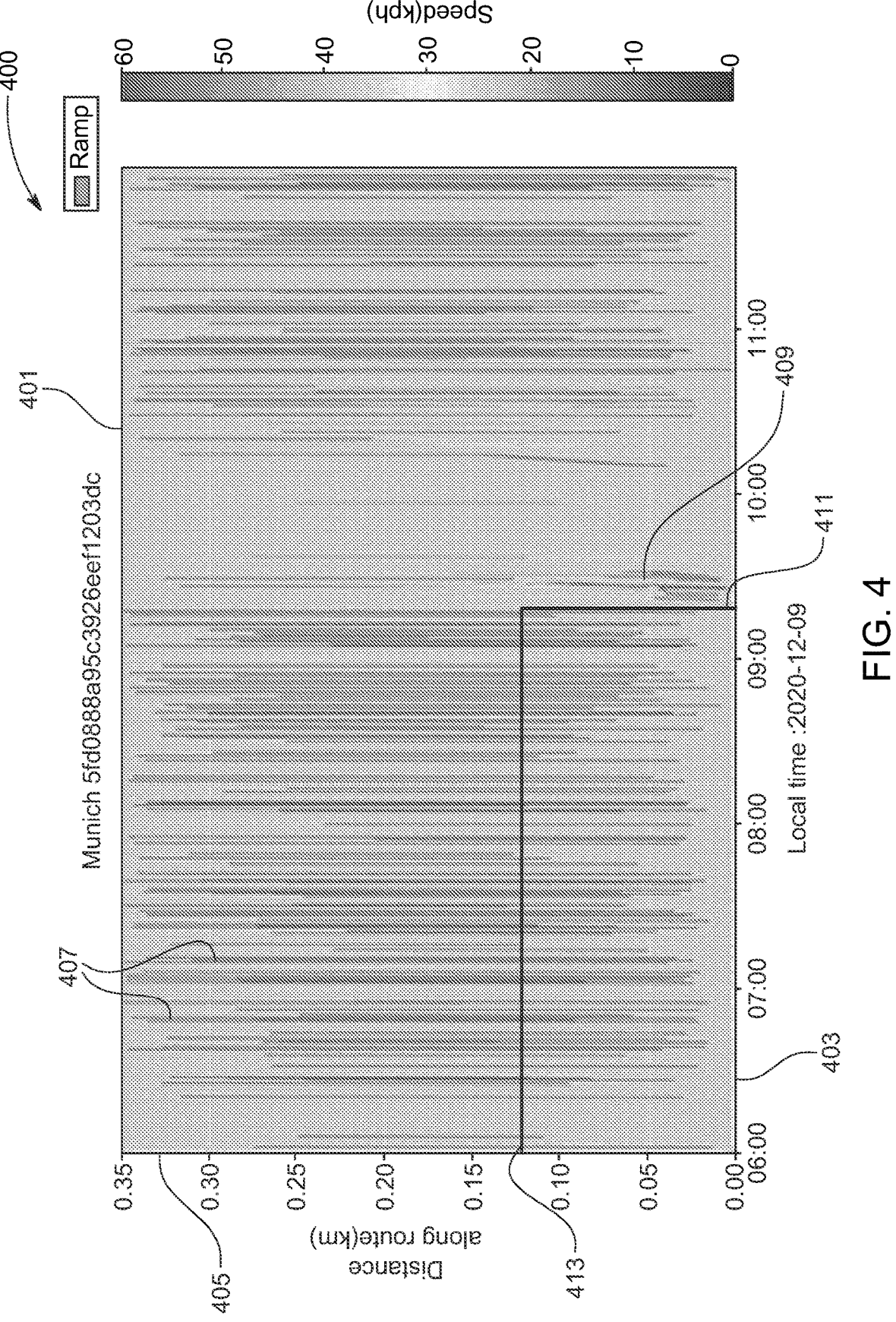
Figure 5:
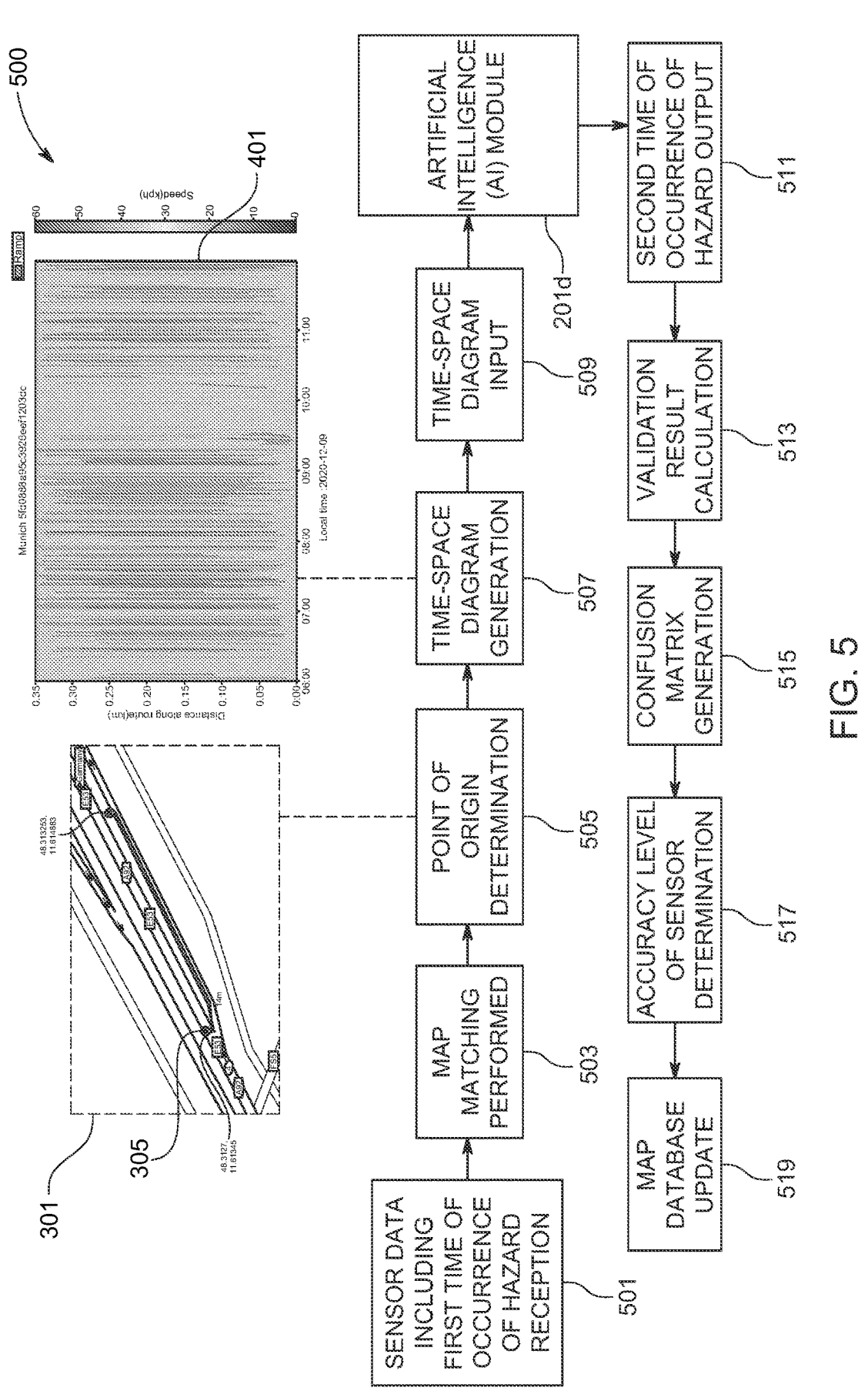

Having thus described example embodiments of the invention in general terms, reference will now be made to the accompanying drawings, which are not necessarily drawn to scale, and wherein:

FIG. 1 illustrates a block diagram of a network environment of a system for validation of sensor data, in accordance with an example embodiment:

FIG. 2A illustrates a block diagram of a system for validation of sensor data, in accordance with an example embodiment:

FIG. 2B illustrates an example map database record storing data, in accordance with one or more example embodiments:

FIG. 2C illustrates another example map database record storing data, in accordance with one or more example embodiments:

FIG. 2D illustrates another example map database storing data, in accordance with one or more example embodiments:

FIG. 3 illustrates an exemplar diagram of a map for determination of a point of origin, in accordance with an example embodiment:

FIG. 4 illustrates an exemplar time-space diagram, in accordance with an example embodiment:

FIG. 5 illustrates a block diagram of a method showing different steps for validation of sensor data, in accordance with an example embodiment: and FIG. 6 illustrates a flow diagram of a method for validation of sensor data, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein: rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry): (b) combinations of circuits and computer program product(s) comprising software and/or firmware instructions stored on one or more computer readable memories that work together to cause an apparatus to perform one or more functions described herein: and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "route" may be used to refer to a path from a source location to a destination location on any link.

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car, or autonomous car. For example, the vehicle may have zero passengers or passengers that do not manually drive the vehicle, but the vehicle drives and maneuvers automatically. There can also be semi-autonomous vehicles.

The term "machine learning model" may be used to refer to a computational or statistical or mathematical model that is based in part or on the whole on artificial intelligence and deep learning techniques. The "machine learning model" is trained over a set of data and using an algorithm that it may use to learn from the dataset.

The term "deep learning" is a type of machine learning that utilizes both structured and unstructured data for training.

End of Definitions

Embodiments of the present disclosure may provide a system, a method, and a computer program product for validation of sensor data. Often times, sensors in hazard warning systems may falsely detect hazards, and thus, may provide incorrect hazard warnings to users. The hazard warning system may detect the hazards, such as broken-down vehicles, slippery roads, reduced visibility due to heavy rain and fog, and accidents. Therefore, there is a need for solution for the validation of sensor data, such that the users may be provided with accurate hazard warnings. The system, the method, and the computer program product facilitating the validation of the sensor data in such an improved manner are described with reference to FIG. 1 to FIG. 6 as detailed below.

FIG. 1 illustrates a block diagram of a network environment 100 of a system 101 for validation of sensor data, in accordance with an example embodiment. The system 101 may be communicatively coupled to a mapping platform 103, a user equipment (UE) 107 and an OEM (Original Equipment Manufacturer) cloud 109 via a network 105. The components described in the network environment 100 may be further broken down into more than one component such as one or more sensors or applications in the system 101 and/or combined together in any suitable arrangement. Further, it is possible that one or more components may be rearranged, changed, added, and/or removed.

In an example embodiment, the system 101 may be embodied in one or more of several ways as per the required implementation. For example, the system 101 may be embodied as a cloud-based service or a cloud-based platform. In each of such embodiments, the system 101 may be communicatively coupled to the components shown in FIG. 1 to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. Further, in one embodiment, the system 101 may be a standalone unit configured to validate sensor data associated with sensors in a hazard warning system of a vehicle. Alternatively, the system 101 may be coupled with an external device such as the autonomous vehicle. In an embodiment, the system 101 may also be referred to as the user equipment UE 107. In some example embodiments, the system 101 may be any user accessible device such as a mobile phone, a smartphone, a portable computer, and the like that are portable in themselves or as a part of another portable/mobile object such as a vehicle. The system 101 may comprise a processor, a memory, and a communication interface. The processor, the memory and the communication interface may be communicatively coupled to each other. In some example embodiments, the system 101 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to a user based on a prediction of a vehicle's accident. In such example embodiments, the system 101 may comprise a processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of system 101. Additional, different, or fewer components may be provided. For example, the system 101 may be configured to execute and run mobile applications such as a messaging application, a browser application, a navigation application, and the like. For example, system 101 may be a dedicated vehicle (or a part thereof) for gathering data related to accident of other vehicles in a database map 103a. For example, the system 101 may be a consumer vehicle (or a part thereof). In some example embodiments, the system 101 may serve the dual purpose of a data gatherer and a beneficiary device. The system 101 may be configured to capture sensor data associated with the vehicle or a road which the system 101 may be traversing. In some scenarios, the system 101 may be configured to receive the sensor data from one or more sensors. The sensor data may for example be audio signals in and outside the vehicle, image data of road objects, road signs, hazard data, or the surroundings (for example buildings). The sensor data may refer to sensor data collected from a sensor unit in the system 101. In accordance with an embodiment, the sensor data may refer to the data captured by the vehicle using sensors.

In some other embodiments, the system 101 may be an OEM (Original Equipment Manufacturer) cloud, such as the OEM cloud 109. The OEM cloud 109 may be configured to anonymize any data received from the system 101, such as the vehicle, before using the data for further processing, such as before sending the data to the mapping platform 103. In some embodiments, anonymization of data may be done by the mapping platform 103.

The mapping platform 103 may comprise a map database 103a for storing map data and a processing server 103b. The map database 103a may include data associated with vehicle's accidents on road/s, one or more of a road sign, or speed signs, or road objects on the link or path. Further, the map database 103a may store accident data, node data, road segment data, link data, point of interest (POI) data, link identification information, heading value records, or the like. Also, the map database 103a further includes speed limit data of each lane, cartographic data, routing data, and/or maneuvering data. Additionally, the map database 103a may be updated dynamically to cumulate real time traffic conditions based on prediction of vehicle's accident. The real-time traffic conditions may be collected by analyzing the location transmitted to the mapping platform 103 by a large number of road users travelling by vehicles through the respective user devices of the road users. In one example, by calculating the speed of the road users along a length of road, the mapping platform 103 may generate a live traffic map, which is stored in the map database 103a in the form of real time traffic conditions based on prediction of vehicle's accident. In one embodiment, the map database 103a may further store historical traffic data that includes travel times, accident prone areas, areas with least and maximum accidents, average speeds and probe counts on each road or area at any given time of the day and any day of the year. According to some example embodiments, the road segment data records may be links or segments representing roads, streets, or paths, as may be used in calculating a route or recorded route information for determination of one or more personalized routes to avoid a zone/route with the predicted accident. The node data may be end points corresponding to the respective links or segments of road segment data. The road link data and the node data may represent a road network used by vehicles such as cars, trucks, buses, motorcycles, and/or other entities. Optionally, the map database 103a may contain path segment and node data records, such as shape points or other data that may represent pedestrian paths, links, or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 103a may also store data about the POIs and their respective locations in the POI records. The map database 103a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103a may include event data (e.g., traffic incidents, construction activities, scheduled events, unscheduled events, vehicle accidents, diversions etc.) associated with the POI data records or other records of the map database 103a associated with the mapping platform 103. Optionally, the map database 103a may contain path segment and node data records or other data that may represent pedestrian paths or areas in addition to or instead of the autonomous vehicle road record data. In an embodiment, the map database 103a may be a source-available document-oriented database.

In some embodiments, the map database 103a may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services in an event of a predicted vehicle's accident, such as route calculation, route guidance, map display, speed calculation, distance and travel time functions, and other functions, by a navigation device, such as by the system 101 or by the UE 107. The navigation-related functions may correspond to vehicle navigation, pedestrian navigation, or other types of navigation to avoid a zone where the vehicle accident has been predicted by the system 101. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the map database 103a may be a master geographic database, but in alternate embodiments, the map database 103a may be embodied as a client-side map database and may represent a compiled navigation database that may be used in the system 101 to provide navigation and/or map-related functions in an event of a predicted vehicle's accident. For example, the map database 103a may be used with the system 101 to provide an end user with navigation features. In such a case, the map database 103a may be downloaded or stored locally (cached) on the system 101.

The processing server 103b may comprise processing means, and communication means. For example, the processing means may comprise one or more processors configured to process requests received from the system 101. The processing means may fetch map data from the map database 103a and transmit the same to the system 101 via the OEM cloud 109 in a format suitable for use by the system 101. In one or more example embodiments, the mapping platform 103 may periodically communicate with the system 101 via the processing server 103b to update a local cache of the map data stored on the system 101. Accordingly, in some example embodiments, the map data may also be stored on the system 101 and may be updated based on periodic communication with the mapping platform 103. In some embodiments, the map data may also be stored on the UE 107 and may be updated based on periodic communication with the mapping platform 103.

In some example embodiments, the UE 107 may be any user accessible device such as a mobile phone, a smartphone, a portable computer, and the like, as a part of another portable/mobile object such as a vehicle. The UE 107 may comprise a processor, a memory, and a communication interface. The processor, the memory and the communication interface may be communicatively coupled to each other. In some example embodiments, the UE 107 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example embodiments, the UE 107 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 107. Additional, different, or fewer components may be provided. In one embodiment, the UE 107 may be directly coupled to the system 101 via the network 105. For example, the UE 107 may be a dedicated vehicle (or a part thereof) for gathering data for development of the map data in the database 103a. In some example embodiments, at least one user equipment such as the UE 107 may be coupled to the system 101 via the OEM cloud 109 and the network 105. For example, the UE 107 may be a consumer vehicle (or a part thereof) and may be a beneficiary of the services provided by the system 101. In some example embodiments, the UE 107 may serve the dual purpose of a data gatherer and a beneficiary device. The UE 107 may be configured to capture the sensor data associated with a road which the UE 107 may be traversing. The sensor data may for example be image data of road objects, road signs, or the surroundings. The sensor data may refer to sensor data collected from a sensor unit in the UE 107. In accordance with an embodiment, the sensor data may refer to the data captured by the vehicle using sensors. The UE 107, may be communicatively coupled to the system 101, the mapping platform 103 and the OEM cloud 109 over the network 105.

The network 105 may be wired, wireless, or any combination of wired and wireless communication networks, such as cellular, Wi-Fi, internet, local area networks, or the like. In one embodiment, the network 105 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an example, the mapping platform 103 may be integrated into a single platform to provide a suite of mapping and navigation related applications for OEM devices, such as the user devices and the system 101. The system 101 may be configured to communicate with the mapping platform 103 over the network 105. Thus, the mapping platform 103 may enable provision of cloud-based services for the system 101, such as, storing the lane marking observations in an OEM cloud in batches or in real-time.

FIG. 2A illustrates a block diagram 200a of the system 101 for validation of the sensor data, in accordance with an example embodiment. The system 101 may include a processing means such as at least one processor 201 (hereinafter, also referred to as "processor 201"), storage means such as at least one memory 203 (hereinafter, also referred to as "memory 203"), and a communication means such as at least one communication interface 205 (hereinafter, also referred to as "communication interface 205"). The processor 201 may further include one or more processing modules, such as a sensor data reception module 201a, a time of occurrence determination module 201b, a validation result calculation module 201c and an artificial intelligence (AI) module 201d. The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

In some embodiments, the processor 201 may be configured to provide Internet-of-Things (IOT) related capabilities to users of the system 101, where the users may be a traveler, a rider, a pedestrian, and the like. In some embodiments, the users may be or correspond to an autonomous or a semi-autonomous vehicle. The IoT related capabilities may in turn be used to provide smart navigation solutions and hazard warnings by providing real time updates to the users to take pro-active decision on turn-maneuvers, lane changes, overtaking, merging and the like, big data analysis, and sensor-based data collection by using the cloud-based mapping system for providing navigation recommendation services to the users. The system 101 may be accessed using the communication interface 205. The communication interface 205 may provide an interface for accessing various features and data stored in the system 101.

Additionally, or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The sensor data reception module 201a may be configured to receive sensor data associated with a hazard. The sensor data may include at least a first time of occurrence of the hazard. In some embodiments, sensors may be utilized by the hazard warning system of the vehicle to detect the hazards. The hazard warning system may detect the hazards, such as broken-down vehicles, slippery roads, reduced visibility due to heavy rain and fog, and accidents. The hazard warning system may further provide alerts or warnings to users, such as a driver and passengers of the vehicles. The sensor data reception module 201a may receive the sensor data from the sensors, such as the GPS sensor, a video camera, hazard lights, air bag sensors, electronic stability control sensors, headlight sensors, fog lights sensors, brake pressure sensors, ignition sensors, and so forth. In some embodiments, the sensor data may include a location (such as a latitude and a longitude of the location) of occurrence of the hazard, information associated with a type of occurred hazard and the first time of occurrence of the hazard.

The time of occurrence determination module 201b may be configured to determine the first time of occurrence of the hazard based on the sensor data. The time of occurrence determination module 201b may be further configured to determine a second time of occurrence of the hazard based on a time-space diagram associated with one or more vehicles that passed through the location of the occurrence of the hazard. In some embodiments, the time-space diagram may depict a change in speeds of the one or more vehicles at the location of the occurrence of the hazard. Based on the change in speeds depicted in the time-space diagram, the time of occurrence determination module 201b may determine the second time of occurrence of the hazard. In some embodiments, the time of occurrence determination module 201b may further extract the first time of occurrence of the hazard from the received sensor data.

The validation result calculation module 201c may be configured to calculate a validation result for the received sensor data based on a comparison of the first time of occurrence and the second time of occurrence, and an associated first predefined threshold. In some embodiments, the predefined threshold of the comparison may lie in a range of −10 minutes to +10 minutes. For example, the first time of occurrence may be 02:00 Post Meridiem (PM), and the second time of occurrence may be 01:55 PM. In such a case, the validation result may be calculated based on a difference between 02:00 PM and 01:55 PM, and the first predefined threshold, i.e., −10 minutes to +10 minutes. Details of the calculation of the validation result, are provided, for example, at 513 in FIG. 5.

The AI module 201d may be configured to process images, such as the time-space diagram provided as an input and output the second time of occurrence of the hazard. In some embodiments, the AI module 201d may include a computer vision-based model that includes analysis and learning of the data using a machine learning algorithm. In some embodiments, the AI module 201d may be configured to determine the second time of occurrence of the hazard based on the time-space diagram associated with the one or more vehicles that passed through the location of the occurrence of the hazard. For this purpose, the AI module 201d is trained on large sets of data. For example, the computer vision-based model may be a federated learning model. In an embodiment, federated learning basically allows training the computer vision-based models on a user's private data without exposing it to the rest of the world. Additionally, federated learning may allow for computer vision-based models to be deployed on a user system, such as the system 101, and to learn using their data locally.

In some embodiments, the AI module 201d is embodied outside the processor 201, and the representation shown in FIG. 2A is for exemplar purpose only. The AI module 201d may provide the necessary intelligence needed by the system 101 for validation of the sensor data.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2A, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The communication interface 205 may comprise input interface and output interface for supporting communications to and from the system 101 or any other component with which the system 101 may communicate. The communication interface 205 may be any means such as a device or circuitry embodied in either hardware or a combination of hardware and software that is configured to receive and/or transmit data to/from a communications device in communication with the system 101. In this regard, the communication interface 205 may include, for example, an antenna (or multiple antennae) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms. In some embodiments, the communication interface 205 may enable communication with a cloud-based network to enable deep learning, such as using the convolutional neural network model 207.

FIG. 2B shows format of the map data 200b stored in the map database 103a according to one or more example embodiments. FIG. 2B shows a link data record 207 that may be used to store data about one or more of the feature lines. This link data record 207 has information (such as "attributes", "fields", etc.) associated with it that allows identification of the nodes associated with the link and/or the geographic positions (e.g., the latitude and longitude coordinates and/or altitude or elevation) of the two nodes. In addition, the link data record 207 may have information (e.g., more "attributes", "fields", etc.) associated with it that specify the permitted speed of travel on the portion of the road represented by the link record, the direction of travel permitted on the road portion represented by the link record, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record that represents another-than-straight road segment may include shape point data. A shape point is a location along a link between its endpoints. To represent the shape of other-than-straight roads, the mapping platform 103 and its associated map database developer selects one or more shape points along the other-than-straight road portion. Shape point data included in the link data record 207 indicate the position, (e.g., latitude, longitude, and optionally, altitude or elevation) of the selected shape points along the represented link.

Additionally, in the compiled geographic database, such as a copy of the map database 103a, there may also be a node data record 209 for each node. The node data record 209 may have associated with it information (such as "attributes", "fields", etc.) that allows identification of the link(s) that connect to it and/or its geographic position (e.g., its latitude, longitude, and optionally altitude or elevation).

In some embodiments, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function but excludes data and attributes that are not needed for performing the function. Thus, the map data may be alternately stored in a format suitable for performing types of navigation functions, and further may be provided on-demand, depending on the type of navigation function.

FIG. 2C shows another format of the map data 200c stored in the map database 103a according to one or more example embodiments. In the FIG. 2C, the map data 200c is stored by specifying a road segment data record 211. The road segment data record 211 is configured to represent data that represents a road network. In FIG. 2C, the map database 103a contains at least one road segment data record 211 (also referred to as "entity" or "entry") for each road segment in a geographic region.

The map database 103a that represents the geographic region of FIG. 2A also includes a database record 213 (a node data record 213a and a node data record 213b) (or "entity" or "entry.") for each node associated with the at least one road segment shown by the road segment data record 211. (The terms "nodes" and "segments" represent only one terminology for describing these physical geographic features and other terminology for describing these features is intended to be encompassed within the scope of these concepts). Each of the node data records 213a and 213b may have associated information (such as "attributes", "fields", etc.) that allows identification of the road segment(s) that connect to it and/or its geographic position (e.g., its latitude and longitude coordinates).

FIG. 2C also shows some of the components of the road segment data record 211 contained in the map database 103a. The road segment data record 211 includes a segment ID 211a by which the data record can be identified in the map database 103a. Each road segment data record 211 has associated with it information (such as "attributes", "fields", etc.) that describes features of the represented road segment. The road segment data record 211 may include data 211b that indicate the restrictions, if any, on the direction of vehicular travel permitted on the represented road segment. The road segment data record 211 includes data 211c that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non-sign posted implicit general speed limit based on legislation.

The road segment data record 211 may also include data 211*d* indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

The road segment data record 211 also includes road grade data 211*e* that indicate the grade or slope of the road segment. In one embodiment, the road grade data 211*e* include road grade change points and a corresponding percentage of grade change. Additionally, the road grade data 211*e* may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 211*e* includes the road grade change points and an actual road grade value for the portion of the road segment after the road grade change point until the next road grade change point or end node. In a further embodiment, the road grade data 211*e* includes elevation data at the road grade change points and nodes. In an alternative embodiment, the road grade data 211*e* is an elevation model which may be used to determine the slope of the road segment.

The road segment data record 211 also includes data 211*g* providing the geographic coordinates (e.g., the latitude and longitude) of the end points of the represented road segment. In one embodiment, the data 211*g* are references to the node data records 213 that represent the nodes corresponding to the end points of the represented road segment.

The road segment data record 211 may also include or be associated with other data 211*f* that refer to various other attributes of the represented road segment. The various attributes associated with a road segment may be included in a single road segment record or may be included in more than one type of record which cross-reference each other. For example, the road segment data record 211 may include data identifying the name or names by which the represented road segment is known, the street address ranges along the represented road segment, and so on.

FIG. 2C also shows some of the components of the node data record 213 contained in the map database 103*a*. Each of the node data records 213 may have associated information (such as "attributes", "fields", etc.) that allows identification of the road segment(s) that connect to it and/or it's geographic position (e.g., its latitude and longitude coordinates). For the embodiment shown in FIG. 2C, the node data records 213*a* and 213*b* include the latitude and longitude coordinates 213*a*1 and 213*b*1 for their nodes. The node data records 213*a* and 213*b* may also include other data 213*a*2 and 213*b*2 that refer to various other attributes of the nodes.

Thus, the overall data stored in the map database 103*a* may be organized in the form of different layers for greater detail, clarity, and precision. Specifically, in the case of high-definition maps, the map data may be organized, stored, sorted, and accessed in the form of three or more layers. These layers may include road level layer, lane level layer and localization layer. The data stored in the map database 103*a* in the formats shown in FIGS. 2B and 2C may be combined in a suitable manner to provide these three or more layers of information. In some embodiments, there may be lesser or fewer number of layers of data also possible, without deviating from the scope of the present disclosure.

FIG. 2D illustrates a block diagram 200*d* of the map database 103*a* storing map data or geographic data 215 in the form of road segments/links, nodes, and one or more associated attributes as discussed above. Furthermore, attributes may refer to features or data layers associated with the link-node database, such as an HD lane data layer.

In addition, the map data may also include other kinds of data 217. The other kinds of data 217 may represent other kinds of geographic features or anything else. The other kinds of data may include point of interest data. For example, the point of interest data may include point of interest records comprising a type (e.g., the type of point of interest, such as restaurant, ATM, etc.), location of the point of interest, a phone number, hours of operation, etc. The map database 103*a* also includes indexes 219. The indexes 219 may include various types of indexes that relate the different types of data to each other or that relate to other aspects of the data contained in the geographic database 103*a*.

The data stored in the map database 103*a* in the various formats discussed above may help in provide precise data for high-definition mapping applications, autonomous vehicle navigation and guidance, cruise control using ADAS, direction control using accurate vehicle maneuvering and other such services. In some embodiments, the system 101 accesses the map database 103*a* storing data in the form of various layers and formats depicted in FIGS. 2B-2D.

FIG. 3 illustrates an exemplar diagram 300 of a map 301 for determination of a point of origin 305, in accordance with an example embodiment. The diagram 300 may include the map 301. The map 301 may depict a location 303 of occurrence of the hazard. The map 301 may further depict a link 307 corresponding to the location 303 of occurrence of the hazard.

In an exemplary scenario, the processor 201 may receive the sensor data associated with the occurrence of the hazard. The sensor data may be received from the sensor of the vehicle that may have experienced the hazard, such as the accident. The sensor data may be received from the sensor via the network 105. The sensor data may include probe data (such as vehicle data). The probe data may include the location 303 of the occurrence of the hazard, such as the latitude coordinates and the longitude coordinates, the first time of the occurrence of the hazard and a speed of the vehicle. The first time of the occurrence of the hazard may be a time of the hazard recorded by the sensor. The sensor data may further include data associated with activated sensors due to the hazard, such as activated air bag sensors.

In order to initiate the validation of the received sensor data, the processor 201 may be configured to utilize the map 301. The processor 201 may identify a portion of the map 301 corresponding to the location 303 of occurrence of the hazard. The received sensor data may include location information, such as a latitude and a longitude of the location 303 of occurrence of the hazard. Based on the location information, the portion of the map 301 corresponding to the location 303 of occurrence of the hazard may be identified. The portion of the map 301 may include a representation of a physical road network of the location 303 of occurrence of the hazard.

The processor 201 may further perform map matching to determine one or more identifiers associated with the link 307 corresponding to the location 303 of occurrence of the hazard. The processor 201, for the map matching, may generate a topology graph for the portion of the map 301. The topology graph may depict a node corresponding to each intersection (or a junction) in the portion of the map 301, and a segment (or an edge) corresponding to each road in the portion of the map 301. The processor 201 may perform the map matching to determine one or more map attributes. The one or more map attributes may include the one or more identifiers such as a topology segment identifier. The topology segment identifier may correspond to the segment that corresponds to the location 303 of occurrence of the hazard. For example, the topology segment identifier may be an alphanumeric string. The topology segment identifier may be associated with information, such as a date, a time and the location 303. An exemplary topology segment identifier may be "5fd0888a95c3926eef1203dc".

In an embodiment, the processor 201 may further translate the topology segment identifier into one or more link port virtual local area networks identifiers (PVID), hereinafter referred as link PVID. The link PVID may be associated with the link 307 or a segment of the link 307 corresponding to the location 303 of the occurrence of the hazard. The link PVID may be determined to identify the link 307 corresponding to the location 303 of the occurrence of the hazard.

In some embodiments, the processor 201 may utilize one or more object-relational mapping techniques to translate the topology segment identifier to the link PVID. In an exemplary scenario, the processor 201 may utilize a relational map object base (RMOB) technique to translate the topology segment identifier to the link PVID. The RMOB technique may utilize an object-oriented programming for the translation.

Based on the one or more identifiers (such as the link PVID) associated with the link 307, the processor 201 may determine the point of origin 305 for the time-space diagram. The processor 201 may select a starting point of the link 307 associated with the link PVID as the point of origin 305 for the time-space diagram.

In some embodiments, there may be one or more link PVID corresponding to the topology segment identifier. In such a case, the processor 201 may be configured to arrange each link PVID of the one or more link PVID in a sequential order with respect to a direction of travel of the vehicle that may have experience the hazard. Further, the processor 201 may select a first node corresponding to a first link PVID of the one or more link PVID arranged in the sequential order as the point of origin 305 for the time-space diagram.

FIG. 4 illustrates an exemplary time-space diagram 401, in accordance with an example embodiment. The time-space diagram 401 includes an X-axis 403 and a Y-axis 405. The X-axis 403 corresponds to a time at which one or more vehicles travelled on the link 307. The Y-axis 405 corresponds to a distance covered by one or more vehicles on the link 307. Thus, the time-space diagram 401 depicts a relationship between the time and the distance travelled by the one or more vehicles.

In some embodiments, the processor 201 may be configured to generate the time-space diagram 401 by utilization of the determined point of origin 305. The determined point of origin 305 may be a starting point for the generation of the time-space diagram 401. For example, the determined point of origin 305 may be a few hundred meters (for example, 200 meters) behind the location 303 of the occurrence of the hazard. The processor 201 may further determine an ending point for the generation of the time-space diagram 401. The ending point may be a few hundred meters (for example, 100 meters) ahead of the location 303 of the occurrence of the hazard.

Furthermore, based on the known time and distance (such as extracted from the sensor data) of each vehicle, the processor 201 may determine the slope of each vehicle. The slope may correspond to a speed of the vehicle. In an exemplary scenario, the speed of each vehicle may be classified as a "normal speed", a "slow speed" and a "very slow speed", based on a predetermined speed range. In an embodiment, the predetermined speed range classified as the normal speed may be 60 miles per hour (mph) to 90 mph. The predetermined speed range classified as the slow speed may be 20 mph to 60 mph. The predetermined speed range classified as the very slow speed may be 0 mph to 20 mph.

For example, the normal speed may be represented by a first color in the time-space diagram 401. The slow speed may be represented by a second color in the time-space diagram 401. The very slow speed may be represented by a third color in the time-space diagram 401. For example, the normal speed of each vehicle may be depicted as the first color such as a green colored line or a slope in the time-space diagram 401. The slow speed of each vehicle may be depicted as the second color such as a yellow colored line or the slope in the time-space diagram 401. The very slow speed of each vehicle may be depicted as the second color such as a red colored line or the slope in the time-space diagram 401.

Moreover, a length of each line or the slope may depend on the distance covered by the vehicle. For example, the length of the green colored line may be more than the length of the red colored line, as the distance covered by the vehicle with the normal speed may be more than the distance covered by the vehicle with the very slow speed in same time.

In some embodiments, the processor 201 may be configured to receive the generated time-space diagram 401 as an input. The processor 201 may further be configured to determine a change in speed of the vehicle based on the generated time-space diagram 401. For example, based on a change in color of the slope from green to yellow, or green to red, the processor 201 may determine the change in speed of the vehicle. Based on the change in speed of the vehicle, the processor 201 may determine the second time 411 of occurrence of the hazard as an output. Furthermore, the processor 201 may determine a corresponding distance 413 on the link 307 at which the vehicle slowed down.

In some embodiments, the processor 201 may be further configured to utilize the AI module 201d for processing the time-space diagram 401 of the one or more vehicles associated with the hazard. The AI module 201d may receive the generated time-space diagram 401 as the input. The AI module 201d may be configured to extract and read the generated time-space diagram 401 to output the second time 411 of occurrence of the hazard.

In some embodiments, the AI module 201d may be trained on a task of determination of the second time 411 of occurrence of the hazard based on the generated time-space diagram 401 as the input. The AI module 201*d* may be trained on a ground truth dataset. The ground truth dataset may include a first set of time-space diagrams, and a second set of time-space diagrams. The first set of time-space diagrams may correspond to the time-space diagrams generated based on one or more vehicles that passed from actual locations of the occurrence of the hazard. The second set of time-space diagrams may correspond to the time-space diagrams generated based on one or more vehicles that passed from locations where no hazards may be detected. The ground truth dataset may correspond to the time-space diagrams associated with different road class, cities, time of day, and so forth, to account for varying density of vehicles.

The AI module 201*d* may be trained to identify and detect the first set of time-space diagrams and the second set of time-space diagrams. After the detection of the first set of time-space diagrams, the AI module 201*d* may be trained to determine the second time 411 of occurrence of the hazard from the first set of time-space diagrams.

In an embodiment, the AI module 201*d* may be a computer vision-based model. The computer vision-based model may be configured to capture and interpret information from images, such as the time-space diagram 401, by utilization of one or more machine learning models. The computer vision-based model may determine the change in color of the line from green to red in the time-space diagram 401. Based on the change in color, the computer vision-based model may determine the time corresponding to the X-axis 403 at which the color has changed from green to red in the time-space diagram 401. The time corresponding to the X-axis 403 may be output as the second time 411 of occurrence of the hazard by the computer vision-based model.

FIG. 5 illustrates a block diagram 500 of a method showing different steps for validation of sensor data, in accordance with an example embodiment. It will be understood that each block of the block diagram 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the block diagram 500 support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The block diagram 500 of FIG. 5 is used for the validation of the sensor data. Fewer, more, or different steps may be provided.

At 501, the processor 201 may be configured to receive the sensor data associated with the occurrence of the hazard. The sensor data may include the first time of occurrence of the hazard. The sensor data may further include the probe data. Details of the reception of the sensor data, are further provided, for example in FIG. 3.

At 503, the map matching may be performed. In some embodiments, the processor 201 may be configured to perform the map matching to determine the one or more identifiers associated with the link 307 corresponding to the location 303 of occurrence of the hazard. For example, the one or more identifiers may include the topology segment identifier and the one or more link PVID. Details of the performance of the map matching, are further provided, for example in FIG. 3.

At 505, the point of origin 305 may be determined. In some embodiments, the processor 201 may be configured to determine the point of origin 305 for the time-space diagram 401. The point of origin 305 may be determined based on the one or more identifiers associated with the link 307 corresponding to the location 303 of occurrence of the hazard. Details of the determination of the point of origin 305, are further provided, for example in FIG. 3.

At 507, the time-space diagram 401 may be generated. In some embodiments, the processor 201 may be configured to generate the time-space diagram 401 by utilization of the determined point of origin 305. The generated time-space diagram 401 may depict speed of the one or more vehicles that passed through the location 303 of the occurrence of the hazard. Details of the generation of the time-space diagram 401, are further provided, for example in FIG. 4.

At 509, the generated time-space diagram 401 may be input to the module 201*d*. In some embodiments, the processor 201 may be configured to input the generated time-space diagram 401 to the AI module 201*d*. In some embodiments, the AI module 201*d* may be the computer vision-based model. The AI module 201*d* may be trained on the task of the determination of the second time 411 of occurrence of the hazard based on the time-space diagram 401 as the input. Details of the input of the time-space diagram 401 to the AI module 201*d*, are further provided, for example in FIG. 4.

At 511, the output from the AI module 201*d* may be received. In some embodiments, the processor 201 may be configured to receive the output from the AI module 201*d*. The AI module 201*d* may determine and output the second time 411 of occurrence of the hazard based on the time-space diagram 401 as the input. The AI module 201*d* may utilize the change in color of the lines in the time-space diagram 401 to determine the second time 411 of occurrence of the hazard. Details of the determination and the output of the second time 411 of occurrence of the hazard, are further provided, for example in FIG. 4.

At 513, the processor 201 may be configured to calculate a validation result for the received sensor data based on a comparison of the first time of occurrence and the second time 414 of occurrence, and an associated first predefined threshold. The first time of occurrence included in the sensor data and the determined second time 414 of occurrence may be compared to check if the first time of occurrence included in the sensor data is accurate. The first predefined threshold may be for example, in a range of −10 minutes to +10 minutes.

In some embodiments, to calculate the validation result based on the comparison, the processor 201 may be further configured to compare the first time of occurrence and the second time 414 of occurrence to compute a difference between the first time of occurrence of the hazard and the second time of occurrence of the hazard. For example, the first time of occurrence may be 11:00 AM. The second time 414 of occurrence may be 10:56 AM. The computed difference between 11:00 AM and 10:56 AM may be 4 minutes. The processor 201 may further compare the computed difference with the first predefined threshold. For example, the first predefined threshold may be −10 minutes to +10 minutes. The validation result may be calculated based on the comparison of the computed difference, i.e., 4 minutes with the first predefined threshold i.e., −10 minutes to +10 minutes.

In some embodiments, the processor 201 may be further configured to calculate the validation result as a true positive data, based on a determination that the computed difference is less than or equal to the first predefined threshold. Referring to the abovementioned example, the computed difference, i.e., 4 minutes is less than the first predefined threshold i.e., −10 minutes to +10 minutes. Therefore, the processor 201 may calculate the validation result as the true positive data. The validation result as the true positive data may depict that the first time of occurrence of the hazard included in the sensor data is accurate.

In some embodiments, the processor 201 may be further configured to calculate the validation result as a false positive data, based on a determination that the computed difference is more than the first predefined threshold. In an exemplary scenario, the first time of occurrence may be 02:00 PM. The second time 414 of occurrence may be 12:15 PM. The computed difference between 02:00 PM and 12:15 PM may be 1 hour and 45 minutes. For example, the first predefined threshold may be −10 minutes to +10 minutes. In such a case, the computed difference, i.e., 1 hour and 45 minutes is more than the first predefined threshold i.e., −10 minutes to +10 minutes. Therefore, the processor 201 may calculate the validation result as the false positive data. The validation result as the false positive data may depict that the first time of occurrence of the hazard included in the sensor data is inaccurate. Based on the validation result, the sensor data may be validated. In an embodiment, the AI module 201*d* may output the validation result as an "accident" based on the detection of the true positive data and may output the validation result as an "no accident" based on the detection of the false positive data.

At 515, a confusion matrix may be generated. In some embodiments, the processor 201 may be further configured to generate the confusion matrix associated with the sensor that records the sensor data. For example, the sensor may be associated with the vehicle that may have experienced the hazard. The confusion matrix may include at least one validation result as the true positive data and at least one validation result as the false positive data. For example, the confusion matrix may be generated for each sensor for which the sensor data needs validation. The confusion matrix may include multiple validation results corresponding to the sensor for which the sensor data needs validation. The confusion matrix may indicate a number of validation result as the true positive data and a number of validation result as the false positive data.

At 517, an accuracy level of the sensor may be determined. In some embodiments, the processor 201 may be further configured to determine the accuracy level of the sensor based on the generated confusion matrix. The sensor may be determined to be accurate when the determined accuracy level is more than or equal to a second predefined threshold. In an exemplary scenario, the generated confusion matrix may include a total number of 100 validation results. Out of the 100 validation results, 93 validation results may be the true positive data and 7 validation results may be the false positive data. Thus, in such a case, the processor 201 may determine the accuracy level of the sensor as 93%. In an embodiment, the second predefined threshold may be 90%. In such a case, the sensor may be determined to be accurate as the determined accuracy level of the sensor is 93% that is more than the predefined threshold of accuracy of 90%.

At 519, the map database 103*a* may be updated. In some embodiments, the processor 201 may be further configured to update the map database 103*a* based on the calculated validation result. The validation result may depict the time of the occurrence of the hazard, and the location 303 of the occurrence of the hazard. Such information may be updated in the map database 103*a*, such as for convenience of the users. Based on the update in the map database 103*a*, the users may be provided with warnings about the occurred hazard on the location 303, as well as updated routes of travel to avoid the location 303 of the hazard.

FIG. 6 illustrates a flow diagram of a method 600 for validation of sensor data, in accordance with an example embodiment. It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 600 illustrated by the flowchart diagram of FIG. 6 is used for validation of the sensor data. Fewer, more, or different steps may be provided.

At step 601, the method 600 comprises receiving the sensor data associated with the hazard. In some embodiments, the sensor data reception module 201a may be configured to receive the sensor data associated with the hazard. The sensor data comprises at least the first time of occurrence of the hazard. For example, the hazard corresponds to the low visibility conditions, such as due to the rain or the fog, the slippery road, the accidents, or the broken-down vehicle. The first time of occurrence of the hazard may be the time of the hazard detected by the sensor.

At step 603, the method 600 comprises determining a second time of occurrence of the hazard based on a time-space diagram associated with one or more vehicles that passed through the location of the occurrence of the hazard. In some embodiments, the time of occurrence determination module 201b may be further configured to determine the second time of occurrence of the hazard based on the time-space diagram 401. In some embodiments, the AI module 201d is configured to determine the second time of occurrence of the hazard based on the time-space diagram received as the input. The time-space diagram may be generated to analyze the change in speeds of the one or more vehicles at the location of the occurrence of the hazard.

At step 605, the method 600 comprises calculating the validation result for the received sensor data based on the comparison of the first time of occurrence and the second time of occurrence, and the associated first predefined threshold. In some embodiments, the validation result calculation module 201c may be configured to calculate the validation result. For example, the first predefined threshold may be −10 minutes to +10 minutes. The validation result may be calculated as the true positive, when the difference between the first time of occurrence and the second time of occurrence lies between −10 minutes to +10 minutes.

The method 600 may be implemented using corresponding circuitry. For example, the method 600 may be implemented by an apparatus or system comprising a processor, a memory, and a communication interface of the kind discussed in conjunction with FIG. 2A.

In some example embodiments, a computer programmable product may be provided. The computer programmable product may comprise at least one non-transitory computer-readable storage medium having stored thereon computer-executable program code instructions that when executed by a computer, cause the computer to execute the method 600.

In an example embodiment, an apparatus for performing the method 600 of FIG. 6 above may comprise a processor (e.g. the processor 201) configured to perform some or each of the operations of the method of FIG. 6 described previously. The processor may, for example, be configured to perform the operations (601-605) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (601-605) may comprise, for example, the processor 201 which may be implemented in the system 101 and/or a device or circuit for executing instructions or executing an algorithm for processing information as described above.

In this way, example embodiments of the invention results in validation of the sensor data associated with the one or more sensors of the hazard warning system of the vehicle, that may be inexpensive and risk-free as compared to the deployed dedicated ground truth drivers. The invention may also provide determination of the accuracy level of the one or more sensors based on the validation result. The invention also allows update of the map database based on the validation result.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for validation of sensor data for a hazard warning system of a vehicle, the system comprising:

at least one non-transitory memory configured to store computer executable instructions; and at least one processor configured to execute the computer executable instructions to:

use an activation of at least one sensor of a hazard warning system of a vehicle to determine a detection of a hazard, wherein the activation of the least one sensor is due to the hazard, and wherein the sensor data received from the at least one sensor comprises at least a first time of occurrence of the hazard, wherein the first time of occurrence is a sensor-based observation of a time that the hazard occurred;

determine a second time of occurrence of the hazard based on a computationally generated time-space diagram, the time-space diagram being generated by the at least one processor using the vehicle trajectory data associated with one or more other vehicles that passed through a location of the occurrence of the hazard prior to or contemporaneously with the detection of the hazard by the at least one sensor, wherein the second time of occurrence is a time-space-diagram-based observation of the time that the hazard occurred;

calculate a validation result for the received sensor data based on a comparison of the first time of occurrence and the second time of occurrence, and an associated first predefined threshold; and update a map database based on the calculated validation result.

2. The system of claim 1, wherein the at least one processor is further configured to:

perform map matching to determine one or more identifiers associated with a link corresponding to the location of occurrence of the hazard;

determine a point of origin for the time-space diagram, based on the one or more identifiers associated with the link; and generate the time-space diagram by utilization of the determined point of origin.

3. The system of claim 1, wherein the at least one processor is further configured to:

receive the generated time-space diagram as an input;

determine a change in speed of the vehicle based on the generated time-space diagram; and determine the second time of occurrence of the hazard as an output, based on the determined change in speed of the vehicle.

4. The system of claim 1, wherein to calculate the validation result based on the comparison, the at least one processor is further configured to:

compare the first time of occurrence and the second time of occurrence to compute a difference between the first time of occurrence of the hazard and the second time of occurrence of the hazard; and compare the computed difference with the first predefined threshold.

5. The system of claim 4, wherein the at least one processor is further configured to calculate the validation result as a true positive data, based on a determination that the computed difference is less than or equal to the first predefined threshold.

6. The system of claim 4, wherein the at least one processor is further configured to calculate the validation result as a false positive data, based on a determination that the computed difference is more than the first predefined threshold.

7. The system of claim 1, wherein the at least one processor is further configured to generate a confusion matrix associated with a sensor that records the sensor data, wherein the confusion matrix comprises:

at least one validation result as a true positive data; and at least one validation result as a false positive data.

8. The system of claim 7, wherein the at least one processor is further configured to determine an accuracy level of the sensor based on the generated confusion matrix, wherein the sensor is determined to be accurate when the determined accuracy level is more than or equal to a second predefined threshold.

9. The system of claim 1, wherein the at least one processor is further configured to utilize an artificial intelligence module for processing the time-space diagram of the vehicle associated with the hazard, wherein the artificial intelligence module is trained on a task of determination of the second time of occurrence of the hazard based on the generated time-space diagram as an input.

10. The system of claim 9, wherein the artificial intelligence module is a computer vision-based model.

11. A method for validation of sensor data for a hazard warning system of a vehicle, the method comprising:

using an activation of at least one sensor of a hazard warning system of a vehicle to determine a detection of a hazard, wherein the activation of the at least one sensor is due to the hazard, and wherein the sensor data received from the at least one sensor comprises at least a first time of occurrence of the hazard, wherein the first time of occurrence is a sensor-based observation of a time that the hazard occurred;

determining a second time of occurrence of the hazard based on a computationally generated time-space diagram, the time-space diagram being generated by the at least one processor using the vehicle trajectory data associated with one or more other vehicles that passed through a location of the occurrence of the hazard prior to or contemporaneously with the detection of the hazard by the at least one sensor, wherein the second time of occurrence is a time-space-diagram-based observation of the time that the hazard occurred;

calculating a validation result for the received sensor data based on a comparison of the first time of occurrence and the second time of occurrence, and an associated first predefined threshold; and updating a map database based on the calculated validation result.

12. The method of claim 11, further comprising:

performing map matching to determine one or more identifiers associated with a link corresponding to the location of occurrence of the hazard;

determining a point of origin for the time-space diagram, based on the one or more identifiers associated with the link; and generating the time-space diagram by utilization of the determined point of origin.

13. The method of claim 11, further comprising:

receiving the generated time-space diagram as an input;

determining a change in speed of the vehicle; and determining the second time of occurrence of the hazard as an output, based on the determined change in speed of the vehicle.

14. The method of claim 11, wherein to calculate the validation result based on the comparison, the method further comprises:

comparing the first time of occurrence and the second time of occurrence to compute a difference between the first time of occurrence of the hazard and the second time of occurrence of the hazard; and comparing the computed difference with the first predefined threshold.

15. The method of claim 14, further comprising calculating the validation result as a true positive data, based on a determination that the computed difference is less than or equal to the first predefined threshold.

16. The method of claim 14, further comprising calculating the validation result as a false positive data, based on a determination that the computed difference is more than the first predefined threshold.

17. The method of claim 11, further comprising generating a confusion matrix associated with a sensor that records the sensor data, wherein the confusion matrix comprises:

at least one validation result as a true positive data; and at least one validation result as a false positive data.

18. The method of claim 17, further comprising determining an accuracy level of the sensor based on the generated confusion matrix, wherein the sensor is determined to be accurate when the determined accuracy level is more than or equal to a second predefined threshold.

19. A computer programmable product comprising a non-transitory computer readable medium having stored thereon computer executable instruction which when executed by one or more processors, cause the one or more processors to carry out operations for updating map data the operations comprising:

using an activation of at least one sensor of a hazard
warning system of a vehicle to determine a detection of
a hazard, wherein the activation of the least one sensor
is due to the hazard, and wherein the sensor data
received from the at least one sensor comprises at least
a first time of occurrence of the hazard, wherein the first
time of occurrence is a sensor-based observation of a
time that the hazard occurred;
determining a second time of occurrence of the hazard
based on a computationally generated time-space diagram, the time-space diagram being generated by the at
least one processor using the vehicle trajectory data
associated with one or more other vehicles that passed
through a location of the occurrence of the hazard prior
to or contemporaneously with the detection of the
hazard by the at least one sensor, wherein the second
time of occurrence is a time-space-diagram-based
observation of the time that the hazard occurred;
calculating a validation result for the received sensor data
based on a comparison of the first time of occurrence
and the second time of occurrence, and an associated
first predefined threshold; and
updating the map data based on the calculated validation
result.

* * * * *

28